United States Patent
Tamilarasan

(10) Patent No.: US 11,554,781 B2
(45) Date of Patent: Jan. 17, 2023

(54) DRIVER ALERTNESS MONITORING INCLUDING A PREDICTIVE SLEEP RISK FACTOR

(71) Applicant: Aptiv Technologies Limited, St. Michael (BB)

(72) Inventor: Santhosh Tamilarasan, Carmel, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 201 days.

(21) Appl. No.: 16/827,309

(22) Filed: Mar. 23, 2020

(65) Prior Publication Data

US 2021/0291838 A1    Sep. 23, 2021

(51) Int. Cl.
| | |
|---|---|
| *B60W 40/08* | (2012.01) |
| *B60W 30/00* | (2006.01) |
| *B60W 40/04* | (2006.01) |
| *B60W 40/06* | (2012.01) |

(52) U.S. Cl.
CPC ............ *B60W 40/08* (2013.01); *B60W 30/00* (2013.01); *B60W 40/04* (2013.01); *B60W 40/06* (2013.01); *B60W 2040/0827* (2013.01); *B60W 2040/0881* (2013.01)

(58) Field of Classification Search
CPC ...... B60W 40/08; B60W 30/00; B60W 40/04; B60W 40/06; B60W 2040/0827; B60W 2040/0881; B60W 2040/0818; G06K 9/00845; G08B 21/06
See application file for complete search history.

(56) References Cited

U.S. PATENT DOCUMENTS

| | | |
|---|---|---|
| 7,202,792 B2 | 4/2007 | Zhang et al. |
| 7,423,540 B2 | 9/2008 | Kisacanin |
| 7,646,422 B2 | 1/2010 | Kisacanin et al. |
| 9,727,056 B2 | 8/2017 | Laur et al. |
| 9,988,055 B1 | 6/2018 | O'Flaherty et al. |
| 10,025,316 B1 | 7/2018 | Hilnbrand et al. |
| 2004/0090334 A1 | 5/2004 | Zhang et al. |
| 2010/0219955 A1 | 9/2010 | Demirdjian et al. |

(Continued)

FOREIGN PATENT DOCUMENTS

WO    2018/146266 A1    8/2018

OTHER PUBLICATIONS

Extended European Search Report for Application No. EP 21 15 6287 dated Jul. 30, 2021.

(Continued)

*Primary Examiner* — Scott A Reinbold
(74) *Attorney, Agent, or Firm* — Carlson, Gaskey & Olds, P.C.

(57) ABSTRACT

An illustrative example system includes at least one alertness detector that is configured to detect an alertness condition of a driver of a vehicle and an alertness condition of a passenger in the vehicle. A controller is configured to determine a sleep risk factor based on the alertness condition of the passenger. The controller is also configured to determine a likelihood that the driver is sleepy based on the alertness condition of the driver and the sleep risk factor. The controller is configured to control a feature of the vehicle to assist the driver when the determined likelihood satisfies a predetermined criterion.

15 Claims, 2 Drawing Sheets

(56) References Cited

U.S. PATENT DOCUMENTS

| | | | | |
|---|---|---|---|---|
| 2017/0344620 | A1* | 11/2017 | Modarresi | G06K 9/00 |
| 2018/0319279 | A1* | 11/2018 | Ikeda | G06K 9/00845 |
| 2019/0011918 | A1* | 1/2019 | Son | G01C 21/362 |
| 2019/0357834 | A1* | 11/2019 | Aarts | G08B 21/06 |
| 2020/0086891 | A1 | 3/2020 | Maeng | |
| 2020/0359934 | A1* | 11/2020 | Banet | A61B 5/318 |
| 2021/0331681 | A1* | 10/2021 | Im | G06F 3/011 |

OTHER PUBLICATIONS

Leger, D., 1994 The cost of sleep-related accidents: a report for the National Commission on Sleep Disorders Research, Sleep 17(1):84-93.

American Automobile Association Foundation for Traffic Safety, 2010 Asleep at the wheel: the prevalence and impact of drowsy driving, http://www.aaafoundation.org/pdf/2010DrowsyDrivingReport.pdf, accessed Jan. 5, 2011.

Sciencenorway, tuesday Apr. 25, 2017: What makes us tired in a car if other passengers are sleeping?, Nancy Bazilchuk.

Volvo will be the First Manufacturer to install Driver Monitoring and Intervention: http://bestride.com/news/volvo-will-be-the-first-manufacturer-to-install-driver-monitoring-and-intervention-to-stop-drunk-and-impaired-drivers to Stop Drunk and Impaired Drivers.

* cited by examiner

DRIVER ALERTNESS MONITORING INCLUDING A PREDICTIVE SLEEP RISK FACTOR

BACKGROUND

Contemporary passenger vehicles include a variety of electronic components. Advances in technology have made it possible to include a variety of sensing and control features. For example, driver monitoring systems are capable of detecting when a driver is drowsy or asleep. Such systems often include a camera that provides image information regarding the driver's eyes. A computing device uses an algorithm to process the image information to make a determination regarding the driver's alertness or attention on the road. For example, if the image information indicates that the driver's eyes are frequently closing or the direction of the driver's gaze is not on the road in front of the vehicle, the system may determine that the driver is drowsy. Some such systems provide an alert to the driver under such circumstances.

One limitation of such systems is that they do not have predictive capability. Another shortcoming is that the determination of the driver's alertness is often based only on information regarding the driver's gaze.

SUMMARY

An illustrative example system includes at least one alertness detector that is configured to detect an alertness condition of a driver of a vehicle and an alertness condition of a passenger in the vehicle. A controller is configured to determine a sleep risk factor based on the alertness condition of the passenger. The controller is also configured to determine a likelihood that the driver is sleepy based on the alertness condition of the driver and the sleep risk factor. The controller is configured to control a feature of the vehicle to assist the driver when the determined likelihood satisfies a predetermined criterion.

In an example embodiment having at least one feature of the system of the previous paragraph, the controller is configured to determine the sleep risk factor based on the alertness condition of the passenger and at least one other condition.

In an example embodiment having at least one feature of the system of any of the previous paragraphs, the at least one other condition is based on at least one of a number of passengers in the vehicle, a location of the passenger in the vehicle, time information, and information regarding a road the vehicle is traveling on.

In an example embodiment having at least one feature of the system of any of the previous paragraphs, the at least one other condition is the number of passengers in the vehicle, the controller is configured to determine an alertness condition of each of the passengers, and the controller is configured to alter a significance of the at least one other condition for determining the sleep risk factor based on the number of the passengers that are drowsy or asleep.

In an example embodiment having at least one feature of the system of any of the previous paragraphs, the controller is configured to assign a first significance when a first number of passengers is asleep or drowsy, and assign a second significance when a second number of passengers is asleep or drowsy; the second number of passengers is higher than the first number of passengers; and the second significance is greater than the first significance.

In an example embodiment having at least one feature of the system of any of the previous paragraphs, the at least one other condition is the location of the passenger in the vehicle, the controller is configured to assign a first a significance of the at least one other condition for determining the sleep risk factor when the passenger is in a front seat of the vehicle, the controller is configured to assign a second a significance of the at least one other condition for determining the sleep risk factor when the passenger is in a rear seat of the vehicle, and the first significance is greater than the second significance.

In an example embodiment having at least one feature of the system of any of the previous paragraphs, the at least one other condition is the time information, the time information includes an amount of time the driver has been driving the vehicle, the time information includes a time of day when the likelihood is being determined, and the controller is configured to alter a significance of the at least one other condition for determining the sleep risk factor based on the amount of time the driver has been driving and the time of day.

In an example embodiment having at least one feature of the system of any of the previous paragraphs, the at least one other condition is the information regarding the road the vehicle is traveling on, the information indicates a type of the road, the information indicates a location of the vehicle, the information indicates a traffic condition of the road in a vicinity of the vehicle, and the controller is configured to alter a significance of the at least one other condition for determining the sleep risk factor based on the type of the road, the location of the vehicle and the traffic condition.

In an example embodiment having at least one feature of the system of any of the previous paragraphs, the controller is configured to determine the sleep risk factor based on a combination of respective values assigned by the controller to a passenger alertness factor, a time factor, and a road factor.

In an example embodiment having at least one feature of the system of any of the previous paragraphs, the controller is configured to: determine the respective value of the passenger alertness factor based on the determined alertness condition of the passenger, a location of the passenger in the vehicle, and a number of passengers in the vehicle; determine the respective value of the time factor based on an amount of time the driver has been driving the vehicle and a time of day when the sleep risk factor is being determined; and determine the respective value of the road factor based on a type of road the vehicle is traveling along, a location of the vehicle, and a traffic condition in a vicinity of the vehicle.

An illustrative example method of monitoring a driver includes detecting an alertness condition of a driver of a vehicle and an alertness condition of a passenger in the vehicle; determining a sleep risk factor based on the alertness condition of the passenger; determining a likelihood that the driver is sleepy based on the alertness condition of the driver and the sleep risk factor; and controlling a feature of the vehicle to assist the driver when the determined likelihood satisfies a predetermined criterion.

In an example embodiment having at least one feature of the method of any of the previous paragraphs, determining the sleep risk factor is based on the alertness condition of the passenger and at least one other condition.

In an example embodiment having at least one feature of the method of any of the previous paragraphs, the at least one other condition is based on at least one of a number of passengers in the vehicle, a location of the passenger in the vehicle, time information, and information regarding a road the vehicle is traveling on.

In an example embodiment having at least one feature of the method of any of the previous paragraphs, the at least one other condition is the number of passengers in the vehicle and the method comprises determining an alertness condition of each of the passengers, and altering a significance of the at least one other condition for determining the sleep risk factor based on the number of the passengers that are drowsy or asleep.

An example embodiment having at least one feature of the method of any of the previous paragraphs includes assigning a first significance when a first number of passengers is asleep or drowsy, and assigning a second significance when a second number of passengers is asleep or drowsy; wherein the second number of passengers is higher than the first number of passengers, and the second significance is greater than the first significance.

In an example embodiment having at least one feature of the method of any of the previous paragraphs, the at least one other condition is the location of the passenger in the vehicle and the method comprises assigning a first a significance of the at least one other condition for determining the sleep risk factor when the passenger is in a front seat of the vehicle, and assigning a second a significance of the at least one other condition for determining the sleep risk factor when the passenger is in a rear seat of the vehicle, wherein the first significance is greater than the second significance.

In an example embodiment having at least one feature of the method of any of the previous paragraphs, the at least one other condition is the time information, the time information includes an amount of time the driver has been driving the vehicle, the time information includes a time of day when the likelihood is being determined, and the method comprises altering a significance of the at least one other condition for determining the sleep risk factor based on the amount of time the driver has been driving and the time of day.

In an example embodiment having at least one feature of the method of any of the previous paragraphs, the at least one other condition is the information regarding the road the vehicle is traveling on, the information indicates a type of the road, the information indicates a location of the vehicle, the information indicates a traffic condition of the road in a vicinity of the vehicle, and the method comprises altering a significance of the at least one other condition for determining the sleep risk factor based on the type of the road, the location of the vehicle and the traffic condition.

In an example embodiment having at least one feature of the method of any of the previous paragraphs, determining the sleep risk factor is based on a combination of respective values assigned by the controller to a passenger alertness factor, a time factor, and a road factor.

An example embodiment having at least one feature of the method of any of the previous paragraphs includes: determining the respective value of the passenger alertness factor based on the determined alertness condition of the passenger, a location of the passenger in the vehicle, and a number of passengers in the vehicle; determining the respective value of the time factor based on an amount of time the driver has been driving the vehicle and a time of day when the sleep risk factor is being determined; and determining the respective value of the road factor based on a type of road the vehicle is traveling along, a location of the vehicle, and a traffic condition in a vicinity of the vehicle.

The various features and advantages of at least one disclosed example embodiment will become apparent to those skilled in the art from the following detailed description. The drawings that accompany the detailed description can be briefly described as follows.

DETAILED DESCRIPTION

Figure 1:
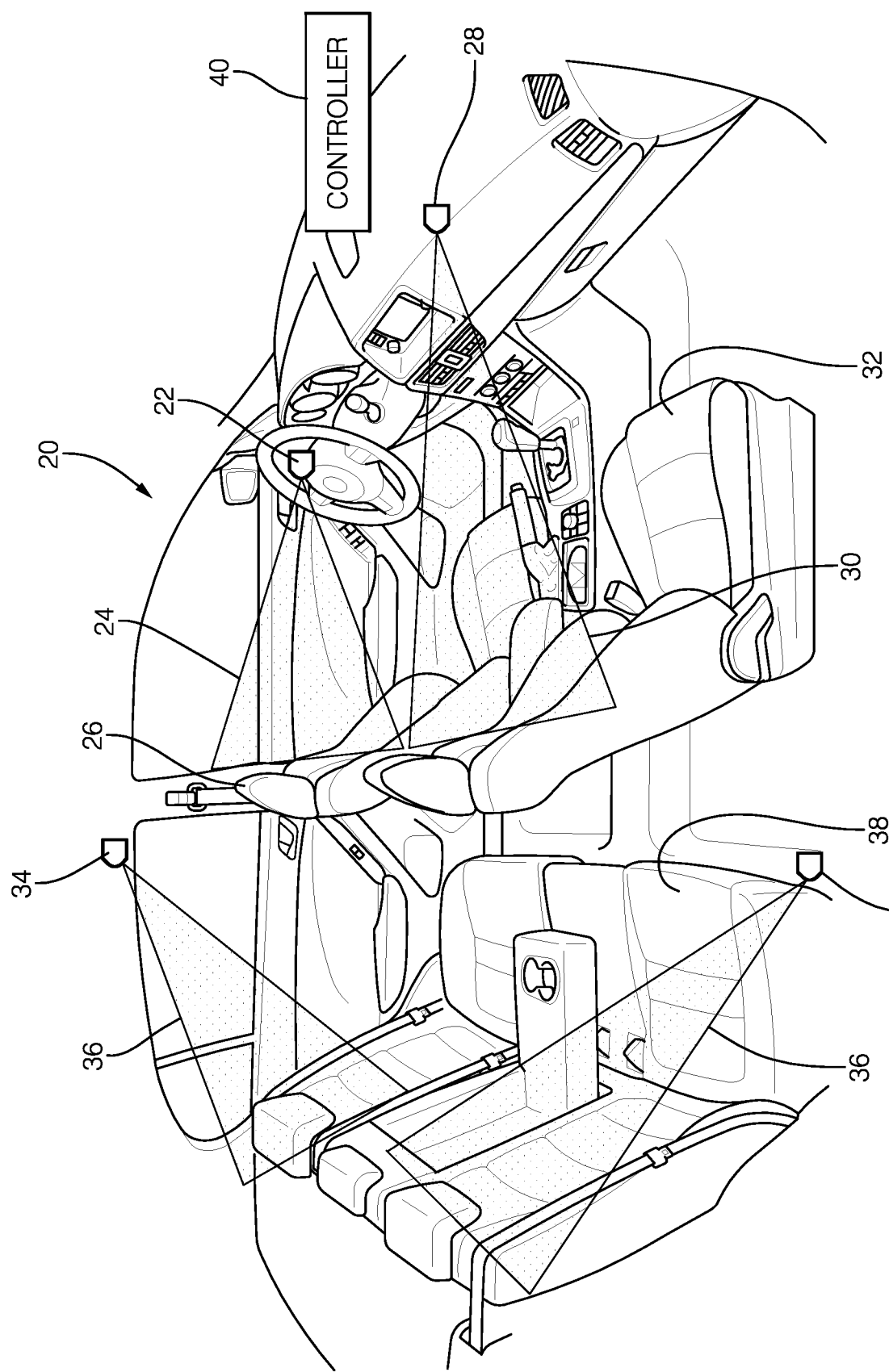
FIG. 1 diagrammatically illustrates selected portions of a vehicle including a driver monitor system designed according to an embodiment of this invention.

FIG. 1 diagrammatically illustrates selected portions of an interior of a vehicle 20. In this example embodiment, a driver alertness detector 22 has a field of view 24 directed toward a driver's seat 26. The driver alertness detector 22 is situated to observe at least one characteristic of a driver (not illustrated) seated in the driver's seat 26. In some examples, the driver alertness detector 22 includes a camera that provides image information regarding the driver's eyes, such as whether they are closed and whether the driver's gaze is directed toward the road in front of the vehicle 20.

A passenger alertness detector 28 has a field of view 30 directed toward a front passenger seat 32 next to the driver's seat 26. The passenger alertness detector 28 in the illustrated example includes a camera that provides image information regarding an individual seated in the front passenger seat 32. For example, the passenger alertness detector 28 provides information regarding the passenger's face, which can be used to determine whether the passenger is drowsy or sleeping.

Additional alertness detectors 34 each include a field of view 36 for observing a passenger located in a rear passenger seat 38. The alertness monitors 34 provide information regarding whether a passenger in the seat 38 is drowsy or asleep, for example.

While the illustrated embodiment includes multiple alertness detectors 22, 28 and 34, some embodiments include a single detector that is capable of providing information regarding an individual in more than one of the seats 26, 32 and 38. Given this description, those skilled in the art will be able to select an arrange appropriate detector components to meet the needs of their particular situation.

A controller 40 receives information from the alertness detectors 22, 28 and 34 regarding the alertness condition of the driver and any passenger in the vehicle 20. The controller 40 is configured to predictively determine a likelihood that the driver is sleepy or asleep based on the information from the alertness detectors regarding the driver and at least one passenger in the vehicle 20.

Figure 2:
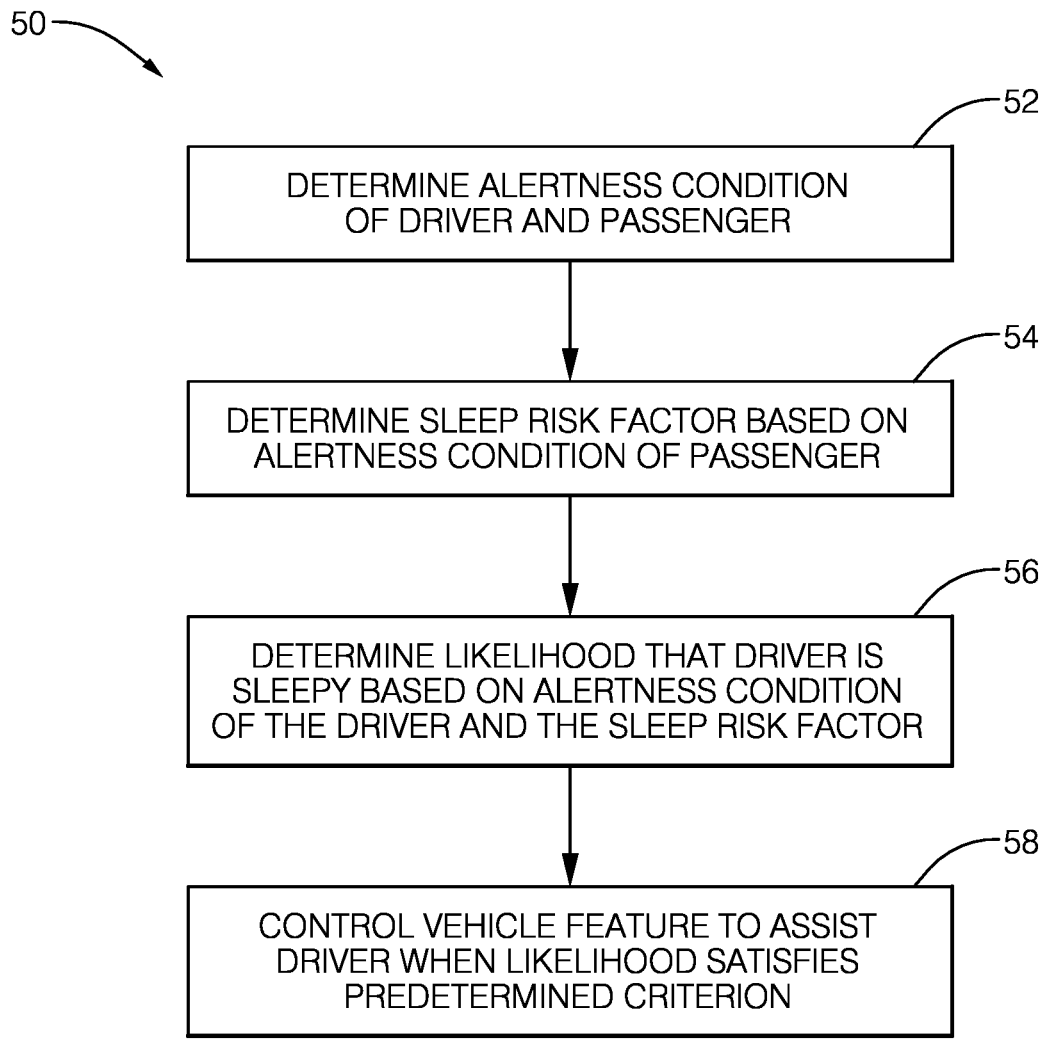
FIG. 2 is a flowchart diagram summarizing an example process of monitoring a driver of a vehicle.

FIG. 2 includes a flowchart diagram 50 that summarizes an example approach. At 52, the controller 40 determines an alertness condition of the driver and any passenger in the vehicle 20. The alertness condition is based on information, such as image data, from the alertness detectors 22, 28 and 34. For example, the alertness condition of the driver is determined based upon image information regarding the driver's eyes and a direction of the driver's gaze. Other information regarding a posture of the driver and a tilt of the driver's head may be used. Some example embodiments include a known algorithm for processing image information regarding a driver's face to determine an alertness condition of the driver.

The controller 40 uses the same or similar techniques for determining the alertness condition of a passenger. The controller 40 also determines a location of each passenger in the vehicle 20, such as whether a passenger is in the front passenger seat 32 or rear passenger seat 38.

At 54, the controller 40 determines a sleep risk factor based on the alertness condition of at least one passenger. If there is more than one passenger in the vehicle, then the sleep risk factor is based on the alertness condition of more than one of the passengers. In some embodiments, the alertness condition of every passenger is taken into account by the controller 40 when determining the sleep risk factor at 54.

The sleep risk factor determined by the controller 40 allows the controller 40 to determine a likelihood that the driver is sleepy in a predictive manner because the sleep risk factor corresponds to conditions or situations within the vehicle 20 that have an influence on predicting whether a driver might fall asleep.

Determining the sleep risk factor at 54 is based on at least the alertness condition of at least one passenger within the vehicle 20. In the illustrated example embodiment, the sleep risk factor is a weighted summation of the alertness condition of the passenger and at least one other condition. Example conditions that are taken into account by the controller 40 in combination with the alertness condition of any passengers include a number of passenger in the vehicle, a location of the passengers in the vehicle, time information, and information regarding a road the vehicle is traveling on. The information regarding the road includes location or map information and traffic information in some embodiments.

The controller 40 determines the sleep risk factor using a weighted sum of passenger information, time information, map information and traffic information using the following relationship:

$$Sleeprisk_{factor}=a(Info_{passenger})+b*(Info_{Time})+c(Info_{Map})+d*(Info_{Traffic})$$

where, a, b, c, and d are weighting factors and a+b+c+d=1. The weighting factors a, b, c and d may be predetermined constants or may be adjusted dynamically by the controller 40 depending upon the particular condition at the time when the controller 40 is determining the sleep risk factor. For example, when the number of passengers asleep in the vehicle is a condition contributing to the sleep risk factor, the controller is configured to determine an alertness condition of each of the passengers and to alter a significance of that condition for determining the sleep risk factor based on the number of the passengers that are drowsy or asleep. When more than one other individual in a vehicle is asleep or drowsy, there is an increased chance that the driver will become sleepy.

In embodiments that include dynamically adjustable weighting factors, the sleep risk factor will increase based on an increased value of $Info_{passenger}$ because of an increased number of sleepy or drowsy passengers and the influence or significance of that number will increase as the weighting factor a increases. For example, the controller 40 is configured to assign a first weight or significance to the weighting factor a when a first number of passengers is asleep or drowsy and assign a second, greater significance when a second, higher number of passengers is asleep or drowsy. In other words, the controller 40 in such embodiments is configured to increase the value of the sleep risk factor when an increased number of passengers in the vehicle 20 is asleep or drowsy by more than just the increase in the value of $Info_{passenger}$.

In an example embodiment, the controller 40 utilizes information regarding the number of passengers that are drowsy or asleep and the seating location of each. In some embodiments, the controller 40 also uses information regarding an amount of time that any of the passengers has been asleep or drowsy. In such embodiments, the controller 40 uses a relationship such as:

$$Info_{passenger}=a_1*seating_{position}+a_2*sleep_{duration}+a_3*sleeping_{number}$$

for determining the value of $Info_{passenger}$ used for the sleep risk factor. The values of $a_1$, $a_2$ and $a_3$ are individual weighting factors for each of the values that contribute to $Info_{passenger}$. Those individual weighting factors may vary to place differing weights on the different information contributing to $Info_{passenger}$. The values of $a_1$, $a_2$ and $a_3$ may be adjusted similarly to how the value of the weighting factor a is adjusted as described above, such as increasing when the corresponding characteristic of the passenger(s) increases in value. In some embodiments, $a_1$, $a_2$ and $a_3$ are predetermined constants.

The example controller 40 is also configured to take into account the location of a passenger in the vehicle. When the passenger is in the front passenger seat 32, the controller assigns a first significance $a_1$ to the passenger location information, which is $seating_{positon}$ in the preceding equation. If the passenger is in the rear passenger seat 38, the controller assigns a second significance $a_1$ to that condition. When a passenger in the front passenger seat 32 is asleep or drowsy, that has a different effect on the likelihood that the driver may be sleepy and the different significances assigned by the controller 40 take that into account.

The weighting factor b may increase as the time of day becomes later so that the time information has a higher influence on the sleep risk factor at night compared to during the day.

The time information utilized by the controller 40 in this example embodiment includes information such as the time of day, the amount of time that the driver has been driving and the duration of recent trips taken by the driver. The controller 40 may use the following relationship for determining the time information:

$$Info_{Time}=b_1*Time_{driving}+b_2*Time_{duration}+b_3*historypreviousstrips_{duration}.$$

where $b_1$, $b_2$ and $b_3$ are weights or significance values that may be predetermined or adjusted by the controller 40.

For example, when a driver has been driving for multiple hours during the night, that contributes to a higher likelihood that the driver is sleepy compared to a driver that has been driving for less time and during the afternoon.

Information regarding the road, such as the location of the vehicle, contributes to the potential fatigue level of the driver. For example, when a driver is driving along a highway there tends to be a higher likelihood that the driver may become drowsy compared to when a driver is in an urban location driving along city streets. Traffic information also is useful for determining a likelihood whether a driver is sleepy. Heavier traffic conditions typically require a higher level of alertness and a driver tends to be less relaxed compared to situations in which there is very light or relatively no traffic. The controller 40 takes such information into account in the illustrated example embodiment.

The weighting factors a, b, c, and d and the individual weighting factors $a_1$, $a_2$, $a_3$, $b_1$, $b_2$ and $b_3$ also may vary independently of changes to the corresponding or related values. In some embodiments, the weighting factors are adjusted based on other selected criteria. The weighting factors allow for adjusting the sleep risk factor in a customized or enhanced manner than just simply increasing a number of sleeping passengers or number of hours that the driver has been driving.

At 56, the controller 40 determines a likelihood that the driver is sleepy based on the alertness condition of the driver and the sleep risk factor. The likelihood that the driver is sleepy accounts for a driver that is asleep, drowsy or falling asleep. For example, if the driver alertness condition corresponds to the driver not being fully awake or not being fully attentive to driving, the alertness condition of the driver suggests a likelihood that the driver is sleepy. When the sleep risk factor corresponds to conditions indicating a higher risk that the driver may be sleepy, there is a higher likelihood that the driver is sleepy. On the other hand, if the driver alertness condition corresponds to the driver being fully alert and awake, the likelihood that the driver is sleepy will be less even though the sleep risk factor may be relatively high based upon the condition of the passengers.

At 58, the controller 40 controls at least one vehicle feature to assist the driver when there is a likelihood that the driver is sleepy that satisfies at least one predetermined criterion. Vehicle features that may be controlled include, for example, turning on or brightening lights within the cabin of the vehicle 20, providing an audible or tactile alert and increasing the volume of any infotainment that may be active within the vehicle 20. Other vehicle features that are controlled in some embodiments include automated vehicle maneuvers, such as slowing down the vehicle and automatically maneuvering the vehicle onto a shoulder of the road where the vehicle is automatically stopped. Various combinations of vehicle features may be controlled in response to a determination that there is a high likelihood that the driver is sleepy.

The controller 40 takes information into account including the alertness condition of at least one passenger in the vehicle for determining the sleep risk factor that allows for predictively determining a likelihood that the driver is sleeping. Using information apart from the alertness condition of the driver provides improved driver alertness determinations and allows for predicting potential sleep conditions.

The preceding description is exemplary rather than limiting in nature.

Variations and modifications to the disclosed examples may become apparent to those skilled in the art that do not necessarily depart from the essence of this invention. The scope of legal protection given to this invention can only be determined by studying the following claims.

I claim:

1. A driver monitoring system, comprising:
at least one alertness detector configured to detect an alertness condition of a driver of a vehicle and an alertness condition of a passenger in the vehicle; and
a controller configured to
determine a sleep risk factor based on the alertness condition of the passenger and a number of passengers in the vehicle,
determine an alertness condition of each of the passengers,
alter a significance of at least one other condition for determining the sleep risk factor based on the number of the passengers that are drowsy or asleep,
determine a likelihood that the driver is sleepy based on the alertness condition of the driver and the sleep risk factor, and
control a feature of the vehicle to assist the driver when the determined likelihood satisfies a predetermined criterion.

2. The system of claim 1, wherein the controller is configured to determine the sleep risk factor based on at least one other condition that is based on at least one of
a location of the passenger in the vehicle,
time information, and
information regarding a road the vehicle is traveling on.

3. The system of claim 1, wherein
the controller is configured to
assign a first significance when a first number of passengers is asleep or drowsy, and
assign a second significance when a second number of passengers is asleep or drowsy;
the second number of passengers is higher than the first number of passengers; and
the second significance is greater than the first significance.

4. The system of claim 2, wherein
the at least one other condition is based on the location of the passenger in the vehicle,
the controller is configured to assign a first a significance of the at least one other condition for determining the sleep risk factor when the passenger is in a front seat of the vehicle,
the controller is configured to assign a second significance of the at least one other condition for determining the sleep risk factor when the passenger is in a rear seat of the vehicle, and
the first significance is greater than the second significance.

5. The system of claim 2, wherein
the at least one other condition is based on the time information,
the time information includes an amount of time the driver has been driving the vehicle,
the time information includes a time of day when the likelihood is being determined, and
the controller is configured to alter a significance of the at least one other condition for determining the sleep risk factor based on the amount of time the driver has been driving and the time of day.

6. The system of claim 2, wherein
the at least one other condition is based on the information regarding the road the vehicle is traveling on,
the information indicates a type of the road,
the information indicates a location of the vehicle,
the information indicates a traffic condition of the road in a vicinity of the vehicle, and
the controller is configured to alter a significance of the at least one other condition for determining the sleep risk factor based on the type of the road, the location of the vehicle and the traffic condition.

7. The system of claim 1, wherein the controller is configured to determine the sleep risk factor based on a combination of respective values assigned by the controller to a passenger alertness factor, a time factor, and a road factor.

8. The system of claim 7, wherein the controller is configured to
determine the respective value of the passenger alertness factor based on
the determined alertness condition of the passenger,
a location of the passenger in the vehicle, and
a number of passengers in the vehicle;
determine the respective value of the time factor based on an amount of time the driver has been driving the vehicle and a time of day when the sleep risk factor is being determined; and determine the respective value of the road factor based on
a type of road the vehicle is traveling along,
a location of the vehicle, and
a traffic condition in a vicinity of the vehicle.

9. A method of monitoring a driver, the method comprising:

detecting an alertness condition of a driver of a vehicle and an alertness condition of a passenger in the vehicle;

determining a sleep risk factor based on a combination of respective values assigned by a controller to a passenger alertness factor, a time factor, and a road factor;

determining the respective value of the passenger alertness factor based on
the determined alertness condition of the passenger,
a location of the passenger in the vehicle, and
a number of passengers in the vehicle;

determining the respective value of the time factor based on
an amount of time the driver has been driving the vehicle and
a time of day when the sleep risk factor is being determined; and determining the respective value of the road factor based on
a type of road the vehicle is traveling along,
a location of the vehicle, and
a traffic condition in a vicinity of the vehicle;

determining a likelihood that the driver is sleepy based on the alertness condition of the driver and the sleep risk factor; and controlling a feature of the vehicle to assist the driver when the determined likelihood satisfies a predetermined criterion.

10. The method of claim 9, wherein there is a plurality of passengers in the vehicle and the method comprises determining an alertness condition of each of the passengers, and altering a significance of the passenger alertness factor for determining the sleep risk factor based on the number of the passengers that are drowsy or asleep.

11. The method of claim 10, comprising assigning a first significance when a first number of passengers is asleep or drowsy, and assigning a second significance when a second number of passengers is asleep or drowsy;

wherein the second number of passengers is higher than the first number of passengers, and the second significance is greater than the first significance.

12. The method of claim 9, comprising assigning a first a significance of the passenger alertness factor for determining the sleep risk factor when the passenger is in a front seat of the vehicle, and assigning a second significance of the passenger alertness factor for determining the sleep risk factor when the passenger is in a rear seat of the vehicle, wherein the first significance is greater than the second significance.

13. The method of claim 9, comprising altering a significance of the time factor for determining the sleep risk factor based on the amount of time the driver has been driving and the time of day.

14. The method of claim 9, comprising altering a significance of the road factor for determining the sleep risk factor based on the type of the road, the location of the vehicle and the traffic condition.

15. A driver monitoring system, comprising:

at least one alertness detector configured to detect an alertness condition of a driver of a vehicle and an alertness condition of a passenger in the vehicle; and a controller configured to determine a sleep risk factor based on the alertness condition of the passenger, determine a likelihood that the driver is sleepy based on the alertness condition of the driver and the sleep risk factor, and control a feature of the vehicle to assist the driver when the determined likelihood satisfies a predetermined criterion, wherein:

the controller is configured to determine the sleep risk factor based on the alertness condition of the passenger and at least one other condition;

the at least one other condition is based on at least one of
a number of passengers in the vehicle,
a location of the passenger in the vehicle,
time information, and
information regarding a road the vehicle is traveling on, the at least one other condition is the location of the passenger in the vehicle;

the controller is configured to assign a first a significance of the at least one other condition for determining the sleep risk factor when the passenger is in a front seat of the vehicle;

the controller is configured to assign a second significance of the at least one other condition for determining the sleep risk factor when the passenger is in a rear seat of the vehicle; and the first significance is greater than the second significance.

* * * * *